Patented July 15, 1952

2,603,640

UNITED STATES PATENT OFFICE 2,603,640

11-BROMO STEROID ADDUCTS

Robert H. Levin and Mildred M. Wesner, Kalamazoo, Mich., assignors to The Upjohn Company, Kalamazoo, Mich., a corporation of Michigan No Drawing. Application May 9, 1951,
Serial No. 225,459

7 Claims. (Cl. 260—239.57)

The present invention relates to adducts of 3-substituted-bisnor-5,7,9-cholatrienic acids and in particular to the 8a,9-lactones of the alkyl maleate adducts of the alkyl 3-β-acyloxy-9-hydroxy-11-bromobisnor-5,7-choladienates.

The compounds of the present invention are represented by the general formula:

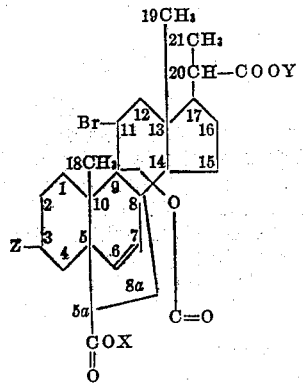

wherein X and Y are saturated aliphatic hydrocarbon radicals containing up to and including eight carbon atoms and Z is an acyloxy group of a hydrocarbon-carboxylic acid containing up to and including seven carbon atoms. These compounds have a bromine radical attached to carbon atom number eleven of the steroid nucleus and can be used in the preparation of C–11-oxygenated steroids and other pharmaceutically useful compounds.

The compounds of the present invention are soluble in ethanol, acetone, diethyl ether, benzene, chloroform, and the like, and insoluble in water and paraffin hydrocarbon solvents. They are usually crystalline solids which can be purified by crystallization from diethyl ether, methanol, isopropanol, and mixtures of benzene and hexane. They can be prepared by the addition of hypobromous acid to the 9–11 double bond of a dialkyl maleate adduct of an alkyl 3-acyloxybisnor-5,7,9-cholatrienate to form a dialkyl maleate adduct of an alkyl 3-acyloxy-9-hydroxy-11-bromobisnor-5,7-choladienate which lactonizes under the conditions of the reaction to form the 8a,9-lactone of a dialkyl maleate adduct of an alkyl 3-β-acyloxy-9-hydroxy-11-bromobisnor-5,7-choladienate.

It has been found that hypobromous acid can be added to the 9–11 double bond of a dialkyl maleate adduct of an alkyl 3-acyloxybisnor-5,7,9-cholatrienate by mixing a solution of hypobromous acid with a solution of a dialkyl maleate adduct of an alkyl 3-acyloxybisnor-5,7,9-cholatrienate at about room temperature for a period from approximately 45 minutes to approximately 4 hours, and then removing the excess hypobromous acid. Various solvents which are unreactive under the conditions of the reaction can be used, such as methyl acetate, ethyl acetate, tertiary butanol and the like.

The hypobromous acid used for the preparation of the compounds of the present invention can be prepared in several ways, such as by mixing mercuric oxide with bromine and water and filtering off the mercuric bromide thus formed, or, preferably, by mixing a solution of N-bromosuccinimide

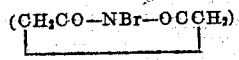

in tertiary butyl alcohol with water and a small amount of sulfuric acid. If desired, the hypobromous acid solution can be prepared first and then mixed with the adduct of the 9–11 unsaturated steroid or, preferably, the hypobromous acid is prepared in the presence of the adduct of the 9–11 unsaturated steroid so that the elements of hypobromous acid add to the 9–11 double bond as soon as they are formed.

The dialkyl maleate adducts of alkyl 3-acyloxybisnor-5,7,9-cholatrienates, which are the starting compounds that are reacted with hypobromous acid in accordance with the process of the present invention, can be prepared by hydrolyzing the maleic anhydride adduct of a 3-acyloxybisnor-5,7,9-cholatrienic acid to form the maleic acid adduct of 3-hydroxybisnor-5,7,9-cholatrienic acid, followed by esterification of the carboxyl groups and acylation of the hydroxyl group, as described by Levin, Wesner and Meinzer in J. A. C. S., 70, 2834 (1948).

Among the compounds contemplated by the present invention are the 8a,9-lactone of the dimethyl maleate adduct of methyl 3-acetoxy-9-hydroxy-11-bromobisnor-5,7-choladienate, the 8a,9-lactone of the diethyl maleate adduct of ethyl 3-propionyloxy-9-hydroxy-11-bromobisnor-5,7-choladienate, the 8a,9-lactone of the di-n-butyl maleate adduct of butyl 3-benzoyloxy-9-hydroxy - 11 - bromobisnor - 5,7 - choladienate, and the 8a,9-lactone of the dioctyl maleate adduct of octyl 3-formyloxy-9-hydroxy-11-bromobisnor-5,7-choladienate.

The following examples are given by way of illustration only and are not to be construed as limiting.

Example 1

A solution of hypobromous acid was prepared by shaking a mixture of 4.79 grams of bromine, 4.33 grams of mercuric oxide and 200 milliliters of water. After all of the bromine had reacted, the suspension was filtered and the filtrate assayed against standard 0.1-normal sodium thiosulfate solution; the solution contained 0.125 mole of hypobromous acid per liter of solution.

To a solution of 100 milligrams of the dimethyl maleate adduct of methyl 3-β-acetoxybisnor-5,7,9-cholatrienate in 3 milliliters of methyl acetate was added 2 milliliters of the foregoing hypobromous acid solution. After the mixture had stood for 45 minutes in the dark, the volatile components were removed by heating the mixture under a subatmospheric pressure on a steam bath. The semi-solid residue, when subjected to elementary analysis, was found to contain 11.6 percent halogen, 13.2 percent halogen being required for the 8a,9-lactone of the dimethyl maleate adduct of methyl 3-acetoxy-9-hydroxy-11-bromobisnor-5,7-choladienate. Infra-red analysis showed that the compound was a 8a,9-lactone.

Example 2

To a solution of 0.55 gram of the dimethyl maleate adduct of methyl 3-β-acetoxybisnor-5,7,9-cholatrienate in 42 milliliters of tertiary butanol was added 6.8 milliliters of water, followed by 0.425 gram of N-bromosuccinimide dissolved in 68 milliliters of tertiary butanol, and then 6.8 milliliters of 0.8 normal sulfuric acid. After the solution had stood for approximately 3¼ hours, the excess hypobromous acid was destroyed by addition of sodium bisulfite and the solvent was removed by heating on a steam bath under reduced pressure. The semi-solid residue was dissolved in approximately 50 milliliters of diethyl ether, washed 3 times with water, dried, and most of the ether removed by evaporation in a stream of air. After concentrating the ethereal solution to about 4 milliliters, the solvent was decanted from the crystals which had formed and the crystals were washed twice with approximately 5-milliliter portions of ether. The 8a,9-lactone of the dimethyl maleate adduct of methyl 3-acetoxy-9-hydroxy-11-bromobisnor-5,7-choladienate thus formed weighed 0.43 gram (71.6 percent of theory) and melted at 182 to 197 degrees centigrade. Two hundred and eighty milligrams of the lactone thus obtained were recrystallized twice from 5 milliliters of methanol to obtain 130 milligrams of pure lactone which had a melting point of 204 to 207 degrees centigrade and analyzed as follows:

Analysis: Calculated for $C_{30}H_{38}O_8Br$: C, 59.4; H, 6.4; Br, 13.2. Found: C, 59.1; H, 6.46; Br, 13.1

Other examples

In manners similar to those disclosed in the two foregoing examples, the 8a,9-lactone of the diethyl maleate adduct of ethyl 3-formoxy-9-hydroxy-11-bromobisnor-5,7-choladienate can be prepared by the addition of hypobromous acid to the diethyl maleate adduct of ethyl 3-formoxybisnor-5,7,9-cholatrienate; the 8a,9-lactone of the dibutyl maleate adduct of butyl 3-benzoyloxy-9-hydroxy-11-bromobisnor-5,7-choladienate can be prepared by the addition of hypobromous acid to the dibutyl maleate adduct of butyl 3-benzoyloxybisnor-5,7,9-cholatrienate; and the 8a,9-lactone of the dioctyl maleate adduct of octyl 3-propionyloxy-9-hydroxy-11-bromobisnor-5,7-choladienate can be prepared by the addition of hypobromous acid to the dioctyl maleate adduct of octyl 3-propionyloxybisnor-5,7,9-cholatrienate.

It is to be understood that the invention is not to be limited to the exact details of operation or exact compounds shown and described, since obvious modifications and equivalents will be apparent to one skilled in the art, and the invention is therefore to be limited only by the scope of the appended claims.

We claim:

1. A 8a,9-lactone having the formula:

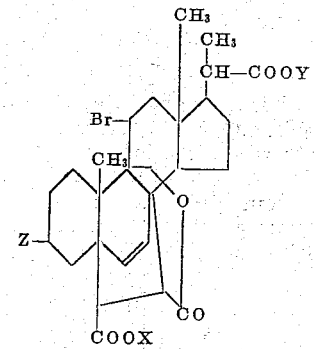

wherein X and Y are radicals of the group consisting of lower aliphatic hydrocarbon radicals containing up to and including eight carbon atoms and Z is a radical of the group consisting of organic hydrocarbon acid radicals containing up to and including seven carbon atoms.

2. The 8a,9-lactone having the formula:

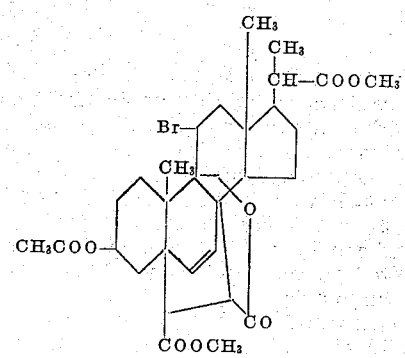

3. The 8a,9-lactone having the formula:

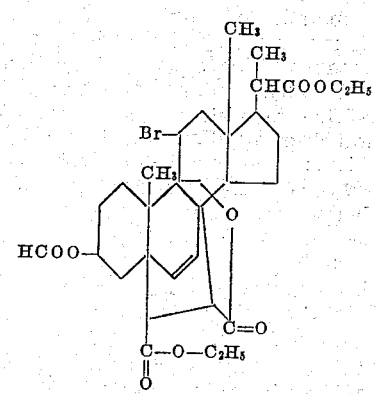

4. The 8a,9-lactone having the formula:

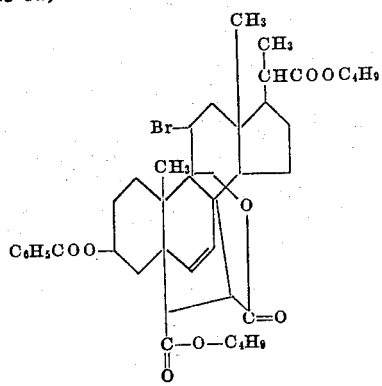

5. The 8a,9-lactone having the formula:

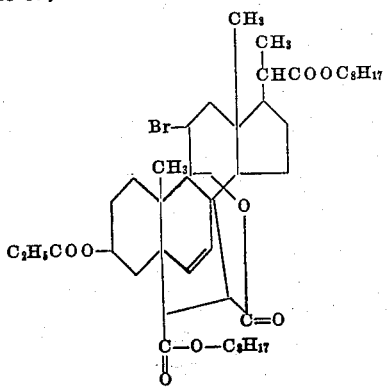

6. A process for the production of a 8a,9-lactone of a dialkyl maleate adduct of an alkyl 3-acyloxy-9-hydroxy-11-bromobisnor-5,7-choladienate from a dialkyl maleate adduct of an alkyl 3-acyloxy-bisnor-5,7,9-cholatrienate which comprises mixing together N-bromosuccinimide, tertiary butanol, water, an acid and a dialkyl maleate adduct of an alkyl 3-acyloxybisnor-5,7,9-cholatrienate and recovering the 8a,9-lactone of a dialkyl maleate adduct of an alkyl 3-acyloxy-9-hydroxy-11-bromobisnor-5,7-choladienate from the resulting mixture.

7. A process for the preparation of the 8a,9-lactone of the dimethyl maleate adduct of methyl 3-acetoxy-9-hydroxy-11-bromobisnor-5,7-choladienate which comprises mixing together a solution of the dimethyl maleate adduct of methyl 3-acetoxybisnor-5,7,9-cholatrienate in tertiary butanol with approximately 2 molecular proportions of N-bromosuccinimide, 2.5 equivalents of sulfuric acid and 3 liters of water per molecular proportion of the adduct, allowing the mixture to stand for approximately 3 hours and recovering the 8a,9-lactone of the dimethyl maleate adduct of methyl 3-acetoxy-9-hydroxy-11-bromobisnor-5,7-choladienate thus formed.

ROBERT H. LEVIN.
MILDRED M. WESNER.

No references cited.